May 22, 1951 F. J. GAFFNEY ET AL 2,553,910

SELECTIVE SIGNALING SYSTEM

Filed Nov. 24, 1947

Inventors
FRANCIS J. GAFFNEY
HERBERT A. FINKE
By Ralph B. Stewart
Attorney

Patented May 22, 1951

2,553,910

UNITED STATES PATENT OFFICE 2,553,910

SELECTIVE SIGNALING SYSTEM

Francis J. Gaffney, Malverne, and Herbert A. Finke, Brooklyn, N. Y., assignors to Polytechnic Research and Development Company Incorporated, Brooklyn, N. Y., a corporation of New York Application November 24, 1947, Serial No. 787,790

8 Claims. (Cl. 177—353)

This invention relates to a selective signalling system for calling or communicating with desired ones of a number of distant stations in the system or within calling range.

The invention is useful in any situation where it is desired to call or communicate with a desired one of a number of receiving stations. For example, it would be useful in systems for directing the operation of taxicabs from a central station, or in police communication systems.

The system of the invention is of the type in which a desired station is selected by transmitting a number of signalling waves of different frequencies, each receiving station being constructed to respond to only one combination of frequencies. While the system described herein employs code combinations of signalling waves of three different frequencies, the combinations may be formed of a greater number of waves of different frequencies if desired. Also, the component waves forming the selecting codes may be transmitted simultaneously or in rapid succession in a periodically recurring sequence.

The invention may be applied to carrier wave systems (either radio or wired systems) in which a carrier wave of relatively high frequency is modulated by the code combination of signalling frequencies, or it may be applied to non-carrier systems where the combination of low frequency signalling waves are applied to a wire system without the use of a carrier wave.

The receiver of the present invention is adapted for construction in a small size especially suitable for use as a portable receiver in a radio system. The selective arrangement is entirely electrical in nature and does not involve resonant relays and other mechanically vibrating parts.

Each called station produces an audible signal upon responding to its particular code combination, and preferably the audible signal is produced by one component of the signalling code which has a frequency within the audible range.

In the preferred form of the system, a carrier wave is modulated by three signalling waves of different frequencies; for example, the three waves may have frequencies of 4200 cycles per second, 2100 cycles per second and 8900 cycles per second respectively. Only one receiver would be adjusted to respond to this particular combination, and if one of the waves is changed to a different frequency, for example, if the 4200 cycle wave were changed to 5200 cycles, the first receiver would not respond, but a different receiver would respond. The number of different discrete frequencies that may be used in the coding will depend upon the extent of the allowed modulation band and the ability of the selective circuits in the receiver to resolve adjacent frequencies. If these last factors permit the use of $n$ discrete frequencies, and these frequencies are used in combinations of three at a time, then the number of receivers that may be selectively signaled is given by $$\frac{n!}{(n-3)!3!}$$

If $n$ is taken as 50, for example, then about 20,000 receivers may be selectively signaled.

The invention is illustrated in the accompanying drawing in which.

Figure 1:
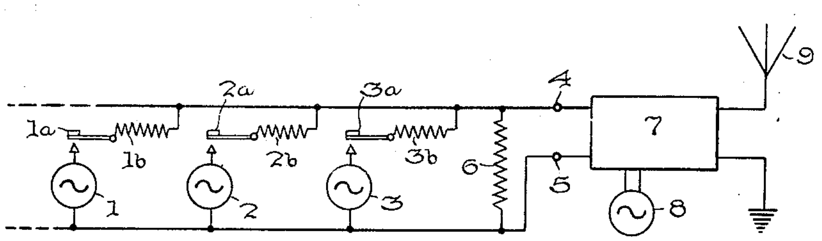
Figure 1 is a diagram of one form of transmitting station where three signal waves are applied simultaneously to modulate the carrier wave.

Referring to Figure 1, three sources of signalling waves of different frequencies are shown at 1, 2 and 3. These sources are connected to common terminals 4 and 5 through controlling keys 1a, 2a and 3a, and series resistors 1b, 2b and 3b may also be included. A common load resistor 6 may be connected across terminals 4 and 5 which are connected to supply signal voltage to the input of a radio modulator 7 provided with a carrier source 8. Modulated waves are radiated by antenna 9 or transmitted to distant receiving stations over a suitable wire system.

Figure 2:
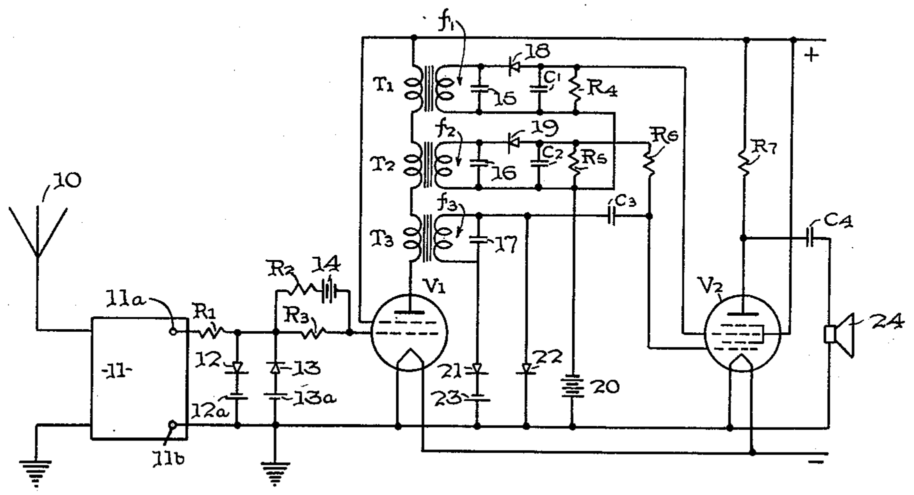
Figure 2 is a diagram of the preferred form of the receiver.

Each receiving station is provided with a receiver shown diagrammatically in Figure 2. Radio waves received on antenna 10 are detected in a receiver 11 of conventional type, such as a super-heterodyne receiver. The detected audio waves appear across terminals 11a and 11b and are supplied to the first grid of tube V1 which may be a subminiature pentode type 2E31. The input voltage to tube V1 is limited by clipping both half-waves by two reversely connected rectifiers 12 and 13, which preferably are germanium crystals biased by batteries 12a and 13a. Series resistances R1 and R3 are connected in the input circuit of tube V1 on opposite sides of the limiters as shown. Battery 14 applies a proper bias to the control grid of tube V1 through resistor R2. The clipping of the waves renders the subsequent operation independent of amplitude variations in the received waves.

After being amplified by tube V1 the audio waves are supplied to three tuned transformers T1, T2 and T3 connected in series in the plate circuit of tube V1. These transformers are tuned to the component frequencies of a particular code combination by condensers 15, 16 and 17 connected across their secondary windings. The voltage developed across condenser 15 is rectified by a detector 18 and develops a direct current voltage across resistor R4, while the voltage across condenser 16 is rectified by rectifier 19 and develops a direct current voltage across resistor R5. Storage condensers C1 and C2 are connected across resistors R4 and R5 respectively, and these two rectifier circuits act as peak reading detector circuits.

Resistors R4 and R5 are connected to the cathode of tube V2 through a source of biasing voltage represented by battery 20. The voltage across R5 is applied to the first grid of tube V2 through resistor R6 and the voltage across R4 is applied directly to the third grid of V2. Preferably this tube is a sub-miniature triode-heptode (type 2021) connected as a pentagrid converter.

The alternating voltage across condenser 17 is applied to the first grid of tube V2 through a blocking condenser C3, and it is preferred to limit this signal voltage to the peaks of the wave by means of a gating arrangement involving two rectifiers 21 and 22 and a biasing battery 23. Rectifier 21 and battery 23 are connected in series between one terminal of condenser 17 and the cathode lead of tube V2, while rectifier 22 is connected between the other terminal of condenser 17 and the same cathode lead. The arrangement is such that rectifier 21 applies a positive pulse to the grid when the pulse exceeds the voltage of battery 23, and rectifier 22 prevents the transmission of the negative pulses.

The plate circuit of tube V2 includes a coupling resistance R7, and a signal device, such as a loud speaker 24, is connected across the plate-cathode leads in series with a blocking condenser C4.

Operation of the receiver of Figure 2 is as follows: Biasing source 20 normally biases the first and third grids of tube V2 well below cut-off, and it requires signal voltages across both resistors R4 and R5 to bring the bias up to cut-off or to the conduction level of the tube. If the third code frequency is also present, the positive pulses applied to the first grid from transformer T3 will energize the speaker 24 at the frequency of this signal component which should be in the audible range. Thus it will be seen that all three signal components are required to operate the signal device 24, and the absence of any one component will prevent its operation.

The system as described may be used for calling purposes alone or it may be used for the transmission of messages by sending the three signal waves according to a telegraphic code which will be reproduced by the speaker 24.

Through the use of a non-resonant transformer for T3, it is possible to transmit voice communication instead of a pure audio tone. This results in a smaller number of codes if the arrangement shown in Figure 1 is used. However, by the use of three code frequencies plus the voice communication, the same number as before may be attained. In this case, the rectified outputs of two of the tuned transformer circuits are added together to open one grid of the converter tube V2, while the third tuned circuit and the voice circuit control the other grid. It is also possible to add the rectified outputs of three tuned circuits to control a tube at V2 having only one control grid.

At this point it is desirable to note that the method of transmission involving impressing each frequency upon the carrier in a periodically recurring sequence has certain advantages over the method of simultaneous impression, in that the possibility of spurious beats and undesired additive responses are eliminated. In this method the time constants for the integrating circuits in the outputs of T1 and T2 are made sufficiently long so that no appreciable change in the rectified voltage across R4 and R5 is evidenced over one cycle of successive impression of each of the three frequencies. In other words, the time constants of the integrating circuits for transformers T1 and T2 must be long enough to hold the tube V2 in a conductive condition during the time of application of the signal wave from transformer T3.

Figure 1A:
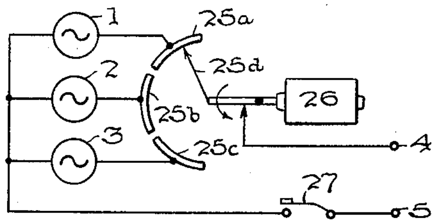
Figure 1a is a diagram of a variation of the transmitter where the three waves are applied in succession and in a periodic sequence.

An arrangement for transmitting the three component frequencies in succession according to a periodic sequence is shown in Figure 1*a*. Here the signal sources 1, 2 and 3 are connected to separate segments 25*a*, 25*b* and 25*c* of a commutator having a rotary brush 25*d* which is driven by a constantly rotating motor 26. The other sides of the three sources are connected to terminal 5 through a suitable key 27, and the brush 25*a* is connected to terminal 4, it being understood that these terminals are the same as those similarly marked in Figure 1. As brush 25*d* rotates past segments 25*a* and 25*b*, un-blocking potentials are stored in condensers C1 and C2, and these hold the tube V2 in conductive state while the brush passes over segment 25*c* to apply the third frequency to the first grid of the tube. It is preferable that the segments cover only a portion of the complete sweep of the brush 25*d* so that after the brush leaves segment 25*c* the charges will be dissipated from condensers C1 and C2 before the brush reaches segment 25*a*.

While only three signal sources are shown in Figures 1 and 1*a*, it will be understood that additional sources of different frequencies will be provided to make up the various code combinations, or the code combinations may be obtained by varying the frequencies of the three sources.

In case the system is applied to a non-carrier wire system, the terminals 4 and 5 of the transmitter would be connected directly to the wire transmission system, and terminals 11*a* and 11*b* of the receiver would be connected directly to the wire system. In this case the limiters 12 and 13 would not be needed. Also, it is not essential that the gating rectifiers 21 and 22 be employed, but the third frequency may be applied to the tube V2 without modification.

From the foregoing it will be seen that the receiving channel at each receiving station includes a vacuum tube (V2) which is normally blocked below cut-off and prevents the transmission of signals in the absence of un-blocking potentials supplied from detector circuits tuned to different component waves of a code combination.

The system may be extended to increase the number of selectively signaled receivers by use of four or more tuned circuits in which the sum of two or more rectified D. C. voltages may serve to gate one of the grids of tube V2. For $n=50$ (see above) a fourth tuned circuit permits approximately a twelve-fold increase in the number of selectively signaled receivers. The use of miniature components allows the circuit described to be built in an extremely small space. Transformers weighing less than 1 ounce are available which have sufficiently high Q to allow approximately 10,000 different code combinations with the arrangement shown. The weight of the entire circuit shown, exclusive of battery supply, is approximately 5 ounces.

We claim:

1. A receiver for a selective signalling system in which a plurality of signal waves of different frequencies are transmitted in code combinations, comprising a signal device and a receiving channel for said device including a vacuum tube normally biased below cut-off to prevent the transmission of signals to said device, a plurality of tuned circuits equal in number to the number of component waves in said code combinations, said circuits being tuned to the component frequencies of one of said code combinations and being energized by the received signal waves, individual rectifier means for two of said tuned circuits for rectifying a portion of the wave energy in the circuits to produce two direct current potentials, and means for applying said two potentials to said tube in a direction to unblock said tube and to fix the biasing potential of the tube at the cut-off point, said receiving channel also including means applying received signal energy to the input of said tube, whereby received signals are transmitted to said signal device.

2. A receiver according to claim 1 wherein at least three tuned circuits are provided, and including means for supplying to the input of said tube from the third tuned circuit a component wave of a code combination having a frequency within the audible range.

3. A receiver according to claim 2 and including gating means in the input circuit of said tube to transmit to said tube only the peaks of the positive pulses of said component wave of audible frequency.

4. A receiver according to claim 1 and including means for supplying to the input of said tube a signal wave of audible frequency.

5. A receiver according to claim 1, for receiving component waves which are transmitted in succession in a periodically recurring series, and wherein said two unblocking potentials are supplied from integrating rectifier circuits having time constants sufficiently long to maintain said unblocking potentials at the conduction level of said tube for a time interval covering each series, and including means for supplying to the input of said tube a signal wave of audible frequency during said time interval.

6. A selective signalling system comprising, in combination, means to transmit a plurality of signal waves of different frequencies according to a code combination, a receiver for said waves including a plurality of circuits tuned to the component waves in said code combination and being energized by the received signal waves, a signal device, a receiving channel for said signal device including a vacuum tube biased below cut-off, means responsive to energization of two of said tuned circuits for supplying a direct current biasing potential to said tube of a value sufficient to operate said tube at the cut-off point, and means responsive to the energization of a third tuned circuit for causing said tube to operate above the cut-off point.

7. A selective signalling system according to claim 6 wherein the component waves of each code combination are transmitted simultaneously.

8. A selective signalling system according to claim 6 wherein the component waves of the code combination are transmitted in succession in a periodically recurring series, and said biasing potential is supplied from two integrating rectifier circuits energized from said two tuned circuits and having time constants sufficiently long to maintain said tube at the conduction level for a time interval covering each series, and including means for supplying to the input of said tube a signal wave of audible frequency during said time interval.

FRANCIS J. GAFFNEY.
HERBERT A. FINKE.

REFERENCES CITED

The following references are of record in the file of this patent:

UNITED STATES PATENTS

| Number | Name | Date |
|---|---|---|
| 1,547,226 | Martin | July 28, 1925 |
| 2,293,869 | Vaughan | Aug. 25, 1942 |
| 2,353,499 | Purington | July 11, 1944 |
| 2,418,521 | Morton | Apr. 8, 1947 |
| 2,431,167 | Byrnes | Nov. 18, 1947 |